March 8, 1955 V. G. TOWNSEND 2,703,497
BIASING MOUNTING
Filed Nov. 13, 1953
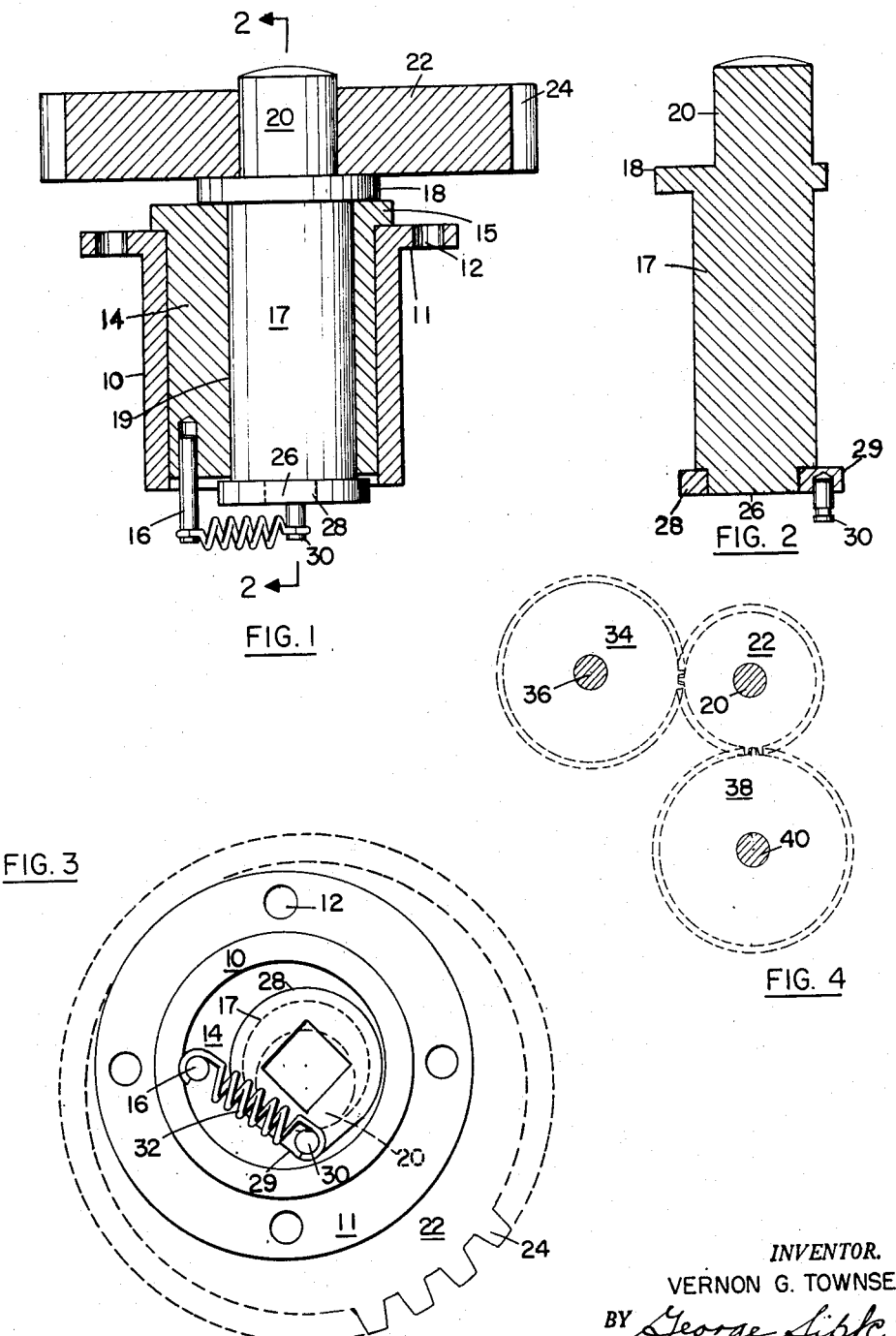
INVENTOR.
VERNON G. TOWNSEND
BY George Sipkin
ATTORNEYS United States Patent Office 2,703,497
Patented Mar. 8, 1955

2,703,497
BIASING MOUNTING

Vernon G. Townsend, Minneapolis, Minn., assignor, by mesne assignments, to the United States of America as represented by the Secretary of the Navy Application November 13, 1953, Serial No. 392,068

2 Claims. (Cl. 74—399)

This invention relates to biasing devices and more especially to a mounting for biasing a shaft.

It is an object of this invention to provide a mounting for a member which mounting biases the member in a plane.

It is another object of this invention to provide a mounting for the idler gear in an anti-back lash gear train.

Other objects and advantages of the invention will hereinafter become more fully apparent from the following description of the annexed drawings, which illustrate a preferred embodiment, and wherein:

Fig. 1 is a sectional view in elevation of the mounting of this invention as applied to the idler gear of a gear train;

Fig. 2 is a sectional view of the central shaft taken on the line 2—2 of Fig. 1;

Fig. 3 is a bottom view of the device shown in Fig. 1; and

Fig. 4 is a view of the idler gear of Fig. 1 in a gear train.

Referring to the drawings, the reference numeral 10 designates a housing having an attachment flange 11 which is provided with attachment holes 12. The housing 10 has a central cylindrical bore in which a sleeve 14 is journaled. The sleeve 14 has an integral collar 15 at its upper end which collar rests on the housing 10. The sleeve 14 also has an internal bore 19 which is parallel to the cylindrical bore of the housing 10 but eccentric with respect to it. A pin 16 is affixed to the sleeve 14.

A shaft 17 is journaled in the eccentric bore 19 of the sleeve 14. The shaft 17 has an integral collar 18 at its upper end and a journal 20, the axis of which is parallel to the axis of the shaft 17, but is spaced therefrom. A square extension 26 is provided on the lower end of the shaft 17 on which a yoke 28 is tightly affixed. An extension 29 on the yoke carries a pin 30 the axis of which is parallel to the axis of the shaft 17, but is spaced therefrom. A tension spring 32 engages both of the pins 30 and 16 to draw them together. A gear wheel 22 having teeth 24 is mounted for rotation on the journal 20.

The action of the mounting of this invention is best illustrated in Fig. 3. The spring 32, through its engagement with the pin 30, tends to rotate the shaft 17 clockwise and to move the journal 20 to the left. The spring 32 also engages the pin 16 and tends to rotate the eccentric sleeve 14 counterclockwise and to move the journal 20 upwardly as viewed in Fig. 3. The combined effect of the rotation of the shaft 17 and the eccentric sleeve 14 is to move the journal 20 diagonally upward and to the left as viewed in Fig. 3. The axis of the pin thus tends to move toward and coincide with the axis of the cylindrical bore of the housing 10.

An application of this device is shown in Fig. 4 in which the gear wheel 22 is an idler gear meshing with a power gear 34 journaled on the shaft 36 and with a driven gear 38 journaled on the shaft 40. In this application, the idler gear 22 would be biased downwardly and to the left by the mounting of this invention. The teeth on the gear wheels 34, 22, and 38 are preferably formed with pressure angles greater than 20° and preferably on the order of 30°. This prevents the teeth of engaging gears from becoming locked together.

This device has been illustrated as one in which the axis of the pin 20 tends to move toward the axis of the cylindrical bore in the housing 10. By relocating the pins 16 and 30 on their respective supports, the axis of the pin 20 may be biased to move away from the axis of the cylindrical bore of the housing. Anti-friction bearings may be substituted for the plane bearing shown to afford greater sensitivity to the biasing action of the device.

It will be apparent from the above that this invention provides a novel mounting for biasing a member either towards or away from a predetermined position and that the mounting is suitable for journaling an idler gear.

Obviously many modifications and variations of the present invention are possible in the light of the above teachings. It is therefore to be understood that within the scope of the appended claims the invention may be practiced otherwise than as specifically described.

What is claimed is:

1. A device for biasing a member with respect to a housing, said device comprising a housing, a first bearing in said housing, a first journal in said first bearing, said first bearing and first journal having a common first axis, a second bearing in said first journal, a second journal in said second bearing, said second bearing and second journal having a common second axis which is parallel to but spaced from said first axis, a projecting member on said second journal extending from said second journal in the direction of said second axis, said projecting member having an axis parallel to but spaced from said second axis, and means for biasing said second journal for rotation to a predetermined position with respect to said first journal.

2. A device for biasing a journalled element with respect to a housing, said device comprising a housing, a first bearing in said housing, a first journal in said first bearing, said first bearing and first journal having a common first axis, a second bearing in said first journal, a second journal in said second bearing, said second bearing and second journal having a common second axis which is parallel to but spaced from said first axis, a third journal secured to said second journal, said third journal having a third axis which is parallel to but spaced from said second axis, an element journalled on said third journal, and means for biasing said second journal for rotation to a predetermined position with respect to said first journal.

References Cited in the file of this patent

UNITED STATES PATENTS 2,397,777     Colman _____ Apr. 2, 1946
2,641,937     Erhardt, Jr., et al. _____ June 16, 1953